United States Patent [19]

Bailey et al.

[11] 4,203,731
[45] May 20, 1980

[54] RADIANT ENERGY GASIFICATION APPARATUS

[76] Inventors: Wayne Bailey, R.D. #2, Schaghticoke, N.Y. 12154; Robert Kemp, Box 96 Lansingburgh, Troy, N.Y. 12182

[21] Appl. No.: 860,984

[22] Filed: Dec. 15, 1977

Related U.S. Application Data

[63] Continuation of Ser. No. 761,216, Jan. 21, 1977, abandoned.

[51] Int. Cl.² ............................................. C10B 1/00
[52] U.S. Cl. ............................................. 48/99; 48/95; 48/120; 48/DIG. 4; 422/224
[58] Field of Search ................ 48/89, 99, 101, 105, 48/107, 94, 95, 119, 120, 197 R, 202, 206, 210, DIG. 4; 422/224

[56] References Cited

U.S. PATENT DOCUMENTS

| | | | |
|---|---|---|---|
| 1,152,196 | 8/1915 | Messerschmitt | 48/99 |
| 2,681,852 | 6/1954 | Atwell | 48/DIG. 4 |
| 3,541,729 | 11/1970 | Dantowitz | 48/214 A |
| 3,685,977 | 8/1972 | Goodman | 48/107 |

Primary Examiner—S. Leon Bashore
Assistant Examiner—George C. Yeung

[57] ABSTRACT

A gas making retort includes a substantially upright mixing chamber opening into a first horizontal refractory cylinder which encloses a second horizontal refractory cylinder. The second cylinder encloses two centrally positioned refractory circular gas out take tubes directly opposite to each other. Each of the cylinders has a cylindrical passageway for the introduction of a mixture of air, steam and a carbonaceous material from the mixing chamber into a gas making space defined between the internal ends of the gas out take tubes wherein a partial combustion of the mixture takes place.

4 Claims, 2 Drawing Figures

4,203,731

RADIANT ENERGY GASIFICATION APPARATUS

This application is a continuation of Ser. No. 761,216, Jan. 21, 1977, now abandoned.

Since petroleum is continually becoming scarcer there is increasing need for means and methods of preparing water for burning as a fuel along with the oil as it comes up from the ground.

In the present instance this is accomplished by decomposing water continually, in our radiant energy heat accummulative water and oil gasifier, where in the water changed to oxygen and hydrogen, and in the presence of petroleum vapor and gas, causes the continual production of carbon monoxide and hydrogen gases, which when mingled for future burning can be then oxidized (or burned) at extremely high speeds and correspondingly high temperatures.

Aircraft turbine engines are being increasingly used in stationary power plants to augment power production by steam and are especially valuable during peak periods when the market for extra power exists and needs to be satisfied. Our equipment lowers the overall fuel costs where this is taking place.

The extremely high temperatures and high speeds at which city gas (hydrogen and carbon monoxide) burns, assures turbines of minimum size and weight and maximum power producing performance.

In the drawings

Figure 1:
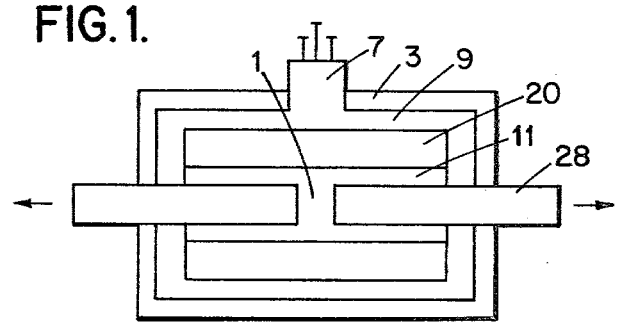
FIG. 1 is a diagrammatic section through the center of one of our gasifiers, and useful mainly for instructional purposes.
Figure 2:
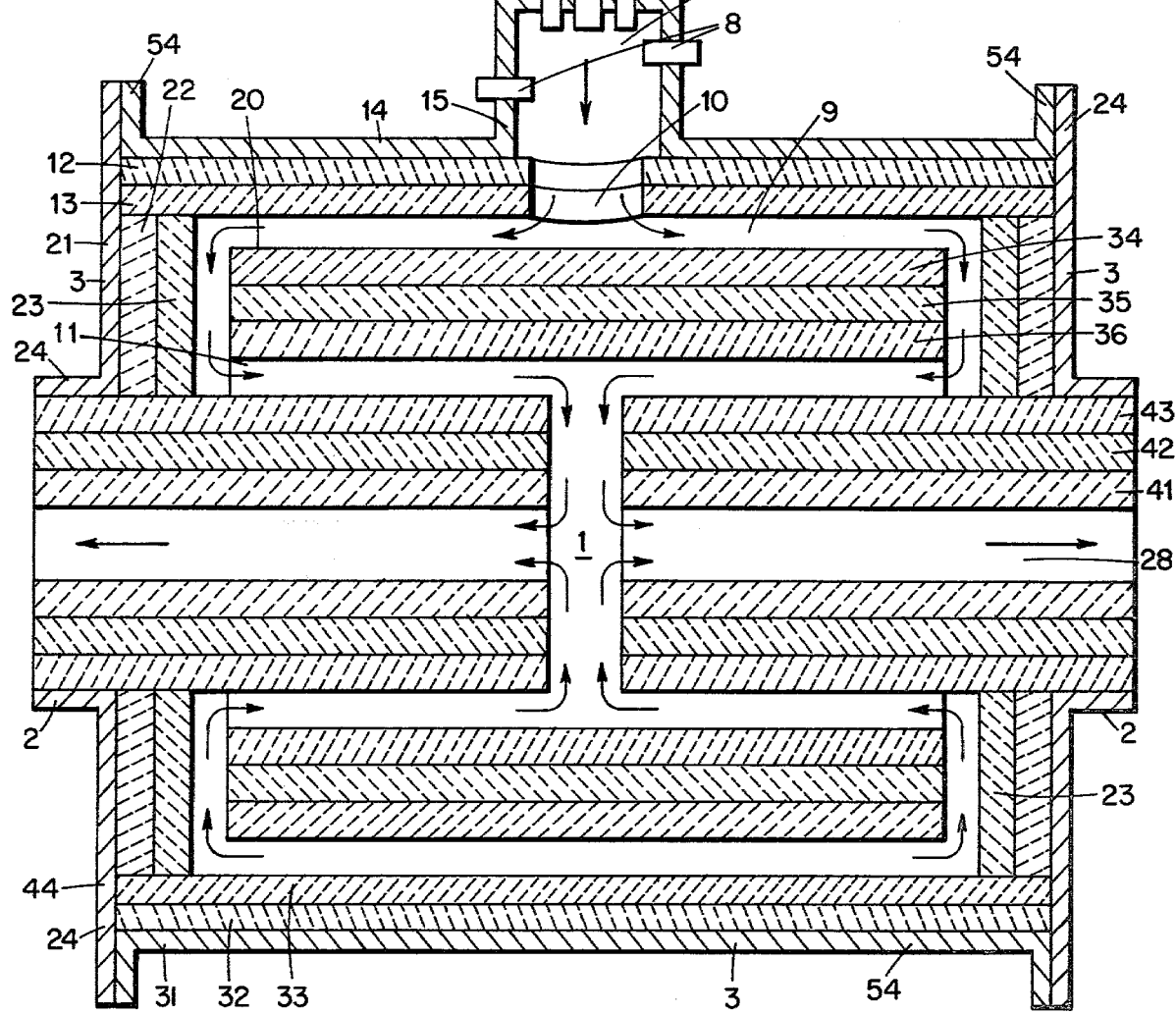
FIG. 2 is similar to FIG. 1 as a central sectional illustration of our radiant energy gasification apparatus, but shows in much more detail (than FIG. 1) the various parts of which our equipment is composed... and how they function to rapidly achieve our "City Gas" production results.

In FIGS. 1 and 2 the numeral 1 indicates the internal area where oxygen from decomposed water vapor grabs the carbon of highly vaporized oil and forms the mixture of hydrogen (from decomposed water) and carbon monoxide which leaves our gasifier through side tubes 2 and 2.

Our equipment (or retort) as a whole is here shown as numeral 3 being cylindrical and in its diameter almost as long as in its lengthwise dimension. Here it is shown as it lies on its side. It is completely covered with heat insulating material (not shown here) to retain as much heat internally as is required by the chemical reactions continually taking place therein.

As illustrated here in its present position, it is in its working positure, continually producing its ultra high speed radiant energy gasification (oil and water) results.

Oil, air and water enter at 4, 5, and 6, enter mixing head 7, and are ignited by spark plugs 8 and 8. At the start up of our equipment the nozzle admitting water can be turned off, the oil nozzle 4 and the air nozzle 5 being the only nozzles functioning at the beginning of the gas producing process.

The air and oil mixture is continuously ignited by the spark plugs 8 and 8. In this way the retort becomes temporarily a furnace, being increasingly heated internally by the burning of the air and oil vapor mixture.

As the interior of the retort becomes hotter and hotter, it (being cylindrical) radiates its heat outwardly. This is met by the incoming mixture of air and oil and as the retort heats up the air coming through air nozzle 5 can be turned down.

Our retort design of two out going cylinders, inside of another cylinder, which in turn is inside another cylinder assures the heat accummulative action upon all incoming materials, the oil vapor, the air, and later the water vapor coming from the water nozzle 6.

On large ocean going vessels (steam boats) the boilers (or boiler furnaces) are served with oil vapor nozzles employing raw steam injection. In this way much water is actually burned because the high temperatures at which these boiler furnaces work decompose the steam (or water vapor) into oxygen and hydrogen. The oxygen grabs the carbon (petroleum vapor) forming carbon monoxide, the mixture of carbon monoxide and hydrogen, highly burnable is burned by mixture with extra air admitted under the furnace grates.

Here however, only during a short starting period, do we have a furnace. As our apparatus heats up, we turn the air nozzle down and down until it is admitting only a small proportion of the air required to fully burn the oil vapor coming from the oil nozzle, the extra heat required to gasify the oil and decompose the water being supplied by the heat built up in the retort itself and being constantly returned to the incoming oil and air mixture, in a so-called heat recuperative fashion.

This is the reason for the cylinder within a cylinder within a cylinder retort (gas making retort) construction.

After the gas making mixture of oil vapor and a very small amount of air to support its partial (or gas making) combustion leave the mixing head 7, it passes down into area 9, where it receives the heat coming in from the center of the equipment. There, the mixture on its way to gasification divides, at 10, passing around the two ends of cylinder 20, and entering area 11 until it arrives at area 1. Here it divides again, half of the resulting gas leaving the retort sideways through the exit tube in one direction, the other half of the gas leaving the opposite exit tube in the opposite direction.

It is well within the scope of our invention to have a fan (a motor driven fan) pulling the finished "City Gas" from both exit tubes, and delivering the "City Gas" (half hydrogen and half carbon monoxide) directly to the gas turbing (the airplane type gas turbine) which is a stationary gas turbine power plant developing extra peak power in combination with a stationary steam power producing power plant.

Due to the cylinder within a cylinder, within a cylinder construction of our retort, when the inner surfaces of our refract-cylinders become white hot, it is then possible to turn on the water nozzle 6 and let the oil vapor (from the oil vapor nozzle 4) and the very small amount of air from the air nozzle 5 carry the water vapor into and beyond the mixing head 7.

FIG. 1 shows the travel route of our gas making materials through our multi-cylindrical gas making retort.

FIG. 2 shows how we prefer to build our retort out of two main types of refractory materials. One of these refractories is carborundum for strength, the second is refractory such as is used for making fire bricks, which unlike carborundum is capable of attaining a white hot surface, that is capable of throwing quantities of radiant heat into and through the gas making mixture traveling at high speeds through our multi-cylindrical gas making retort.

Carborundum, unfortunately, is unable to glow with a white hot heat at the temperatures we prefer to use while making our "City Gas" mixture. But at these same high temperatures, the carborundum tubes have exceptional strength, and do not disintegrate and fall apart as would cylinders made entirely from the fire brick kind of refractory material. Nevertheless, we have to have white hot refractory surfaces because the gasification must proceed at very high speeds. This is why it is known as "Radiant Energy Recuperative Gas Making Process."

There are furnaces for making heat. There are gas making retorts for producing a burnable gas. Gas making retorts are of two kinds, those operating on an intermittent gas producing cycle, and those making gas continuously. Our gas making retort makes gas continuously. And it can operate making gas either from using petroleum (or a liquid hydrocarbon) or pylverized fuel such as pulverized coal or pulverized coke.

Furnaces function using solid, liquid or pulverant hydrocarbon or carbon fuels mainly for heat production. The work with air fuel mixtures leaves gases such as carbon dioxide and nitrogen issuing from furnace stacks (or chimney stacks) gases no longer capable of being burned or producing heat.

Intermittly operating city gas making retorts, are filled with a charge of coal or coke (in lumps) that is ignited by the previous fuel charge that immediately preceded it. One in the retort (that is stationary) the fuel ignites and is blown to a white heat by an air blast. At the proper time, when the fuel charge is fully ignited and white hot, the air blast is turned off, and the fire is then blasted with steam. The steam is decomposed into oxygen and hydrogen, the oxygen grabbing the carbon (white hot coal or coke) and forming carbon monoxide, which with the hydrogen from the decomposed water (or steam) goes to the gas cooler where any tar is removed, and then to the vertically expanding gas holder that are well known at points where city gas is under production by this intermittent gas producing cycle.

In our process however, it is only at the beginning of our gas making process where we have to operate our retort as a furnace (to get it up to operating heat). Once our retort is sufficiently hot, from that point on, it is no longer used as a furnace, but as a continuous radiant energy gas making method, the fuel vapor, the air (introduced under pressure) and the water vapor (from water also introduced under high pressure) so that it is actually a continuous ingoing vapor. Unlike a furnace, what comes out of our retort is highly (and rapidly) burnable to produce heat (outside the retort).

In FIG. 1, among the numerals are the number 3 representing the entire gas making retort, the number 7, representing the mixing chamber at the upper side of the retort, the first cylindrical passage way is number 9, the second cylindrical passageway is number 11, and the center of the retort 1, number 2 illustrates both gas outgoing passages. Numeral 20 covers the intermediate refractory cylinder along and around which the gas making mixture passes and is acted upon by the white hot refractory surfaces and the intense heat (as radiant energy) coming off these same surfaces.

In FIG. 2, the numbers on the drawing show the parts of our continuous gas making retort in much more detail. Here the numeral 3, indicates not only the entire retort but also the sheet steel housing in which the retort is properly enclosed. Next to this sheet steel enclosure is the large carborundum cylinder 12 that also completely encircles the rest of the retort parts. The intermediate carborundum cylinder is designated by numeral 35 . . . the two carborundum cylinders helping to comprise the gas outgoing tubes bearing number 42 and 42.

Inside carborundum tube cylinder 12 is the lining of fire brick refractory 13. On both sides of the carborundum cylinder 35 are the firebrick refractory cylinders 34 and 36. In much the same manner inside and outside of the carborundum tubes 42 and 42 are the firebrick refractory tubes 43 and 43 and 41 and 41. These fire brick refractory surfaces when they get white hot throw off intense radiant energy into the gas making mixture that is flowing past them at high speeds during the continuous process in the making of "City Gas". To protect the ends of the retort (and its sheet steel cover) we have discs (or large washers) of carborundum 22 and 22 at both ends of the retort to protect the sheet steel outer end covers from melting. Inside these carborundum discs (or washers) are shown the firebrick type refractories in the same form on the inner surface of the carborundum ends 22 and 22. These fire brick discs or washers are numbered 23 and are positioned at both ends of the retort.

As the gas making mixture speeds through the retort it never sees any of the carborundum surfaces, but is only exposed to the white hot firebrick refractory surfaces that accomplish the production of "city gas" continuously and completely.

In our retort, since it is composed of a pair of cylinders, within a cylinder that is then in turn within another cylinder, and where all of these various cylinders are composed of refractory material, these curved cylindrical surfaces continually focus all the internal heat in the retort towards the center of the retort, where the final manufacture of "City Gas" (a mixture of carbon monoxide and hydrogen) takes place.

Also it is to be noted, the heat radiating outwardly from this superhot retort center gives its heat in a heat recuperative manner to the gas making mixture flowing inwardly toward the center of our retort. In other words, the heat from the partial combustion of the first cubic foot of gas mixture coming through the retort radiates to the second cubic foot of gas mixture coming through, this helps to step up the temperatures inside the retort.

This heat recuperative action makes possible the production of "City Gas" which when it is later burned (as in a gas turbine) means that water is actually being burned as well as petroleum, and that our continuous radiant energy method of making "City Gas" is not only etremely rapid but also highly efficient. Only a small amount of petroleum is burned to complete combustion in the making of the "City Gas". So our gas making operation is extremely efficient in its use of the minimum amount of petroleum fuel to accomplish the result.

If coal or coke is very finely pulverized to a point of being capable of compression and going through a nozzle into the mixing area 7 when water is nozzeled into the mixing head and it all starts through the retort, the same result can be expected (the production of "City Gas"). This method is as if we were dealing with the injection of petroleum alone.

This invention here may be broadened to cover the complete production of power by using the "City Gas" thus produced in an aircraft type gas turbine.

Our priority extends to the filing date of our previous application Ser. No. 761,216.

We claim:

1. A continuous high speed gas making retort having a substantially upright mixture chamber opening into a refractory cylinder inside of which there is another refractory cylinder each of which cylinders are substantially horizontal with means defining a circular space between each of said refractory cylinders and enclosing two centrally positioned refractory circular gas out take tubes directly opposite to each other with a gas making space between their two internal ends and with further means defining a circular space around each of said refractory gas out take tubes and means for introducing air, oil (or pulverized carbon fuel) and finely divided water into said gas making retort, via said upright mixing chamber.

2. The invention in claim 1 including refractory washer shaped members spaced apart from said another refractory cylinder and positioned at each end of said another cylinder.

3. The invention in claim 1 including a sheet steel casing enclosing the refractory cylinders detailed in claim 1.

4. The invention in claim 2 including a sheet steel casing enclosing the refractory cylinders detailed in claim 2.

* * * * *